July 3, 1956
H. B. SHADID
2,752,629
MEAT GRINDING ATTACHMENT
Filed Aug. 17, 1955
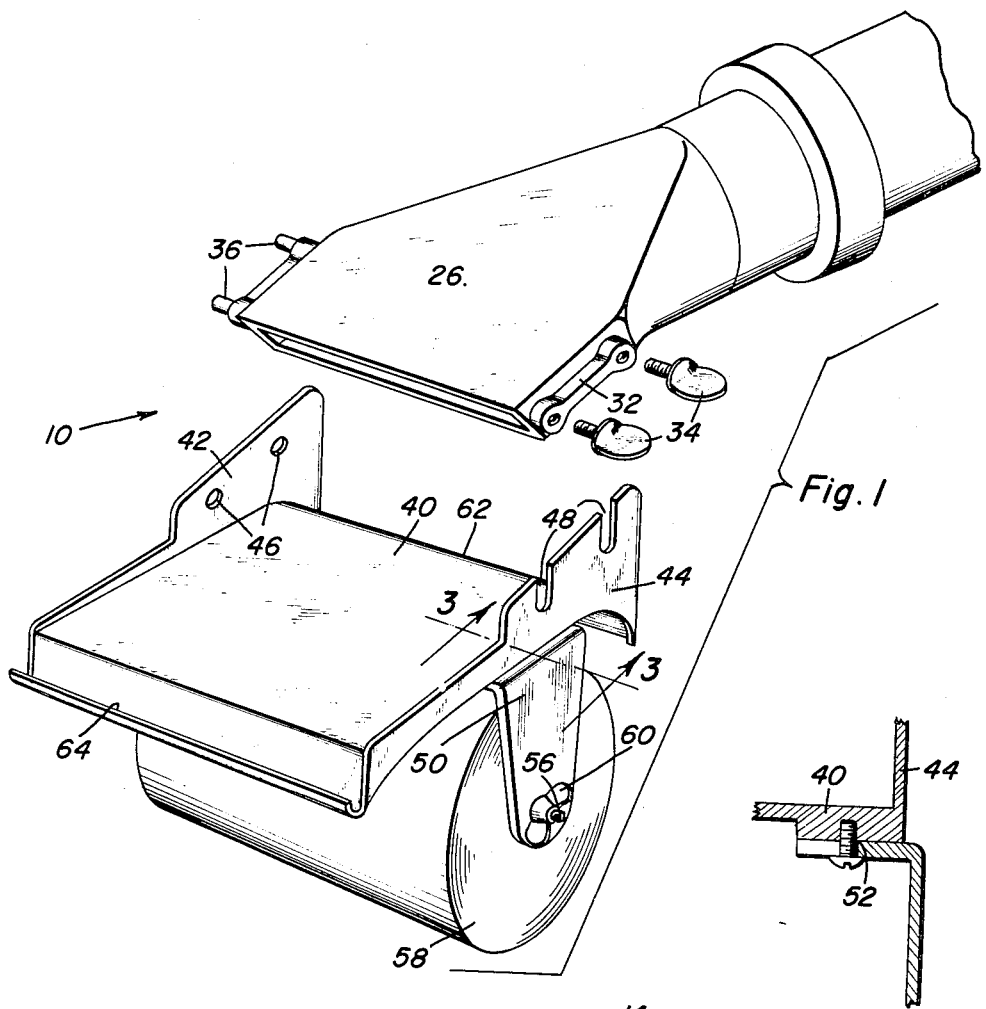
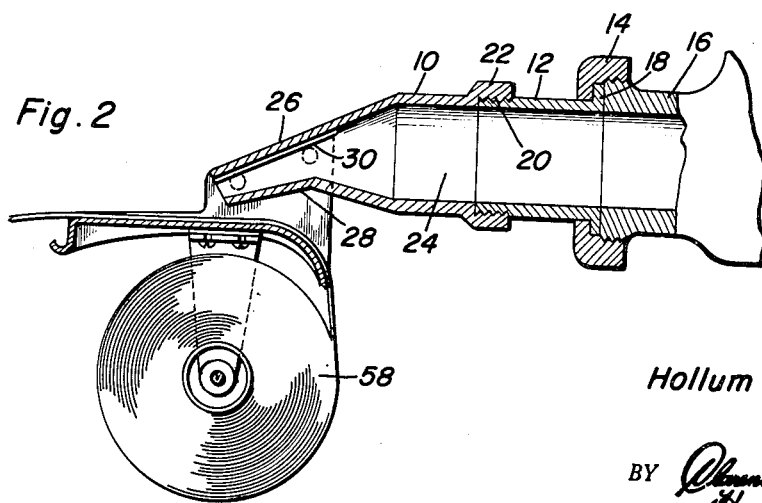
Hollum B. Shadid
INVENTOR.
BY *Clarence A. O'Brien
and Harvey B. Jacobson*
Attorneys United States Patent Office 2,752,629
Patented July 3, 1956

2,752,629

MEAT GRINDING ATTACHMENT

Hollum B. Shadid, Oklahoma City, Okla.

Application August 17, 1955, Serial No. 529,052

5 Claims. (Cl. 17—32)

This invention relates to a novel attachment for a grinder adapted to be utilized in the preparation of a meat product and this application is a continuation-in-part of my copending application Serial No. 461,398, filed October 11, 1954.

The primary object of the present invention resides in the provision of an apparatus for preparing an unexpectedly appetizing and tasty meat product from scraps of lean beef and connective tissues such as those which normally adhere to bones and muscles.

A further object of the invention resides in the provision of a meat product prepared from inexpensive cuts of meat which, when prepared with the present invention, results in a highly nourishing, tasty and desirable meat product.

The present invention incorporates an attachment for a meat grinder or a meat conveying apparatus such as the auger in a conventional meat grinder together with a compressing and shaping arrangement which compresses the ground meat product and also interweaves the fibers during the transition of a column of meat from a generally cylindrical shape to a generally transversely elongated or flattened shape wherein the fibers are intertwined during movement of the ground meat laterally over a plurality of projections or teeth with the projections or teeth leaving a plurality of longitudinal ridges in one surface of the meat product thereby increasing the surface area thereof and providing an attractive type of meat product which will be pleasing in appearance and be attractive to a prospective customer.

A further object of this invention resides in the provision of a novel grinder attachment which enables the platform onto which the compressed meat product is received to be supplied with paper in a convenient manner while also allowing the platform to be adjustably suspended at a selective height whereby the paper will be fed by the movement of the meat through the shaper in an optimum manner.

Still further objects and features of this invention reside in the provision of an attachment for a meat grinder which is simple in construction, highly efficient in operation, relatively inexpensive to produce, and which may be made of suitable material, such as cast aluminum or the like so as to conform to the various sanitary codes of the different States of the United States.

These, together with the various ancillary objects and features of the invention which will become apparent as the following description proceeds, are attained by this meat grinder attachment and process for preparing a meat product as well as by the composition used therewith, a preferred embodiment of the apparatus being shown in the accompanying drawings, by way of example only, wherein:

Figure 1 is a perspective view of the meat grinder attachment comprising the present invention;

Figure 2 is a vertical sectional detail view illustrating the various component elements of the meat grinder attachment; and Figure 3 is an enlarged sectional detail view as taken along the plane of line 3—3 in Figure 1.

With continuing reference to the accompanying drawings wherein like reference numerals designate similar parts throughout the various views, reference numeral 10 generally designates the meat grinder attachment comprising the present invention. This meat grinder attachment includes an adapter 12 adapted to be lockingly held by the connector ring 14 of a meat grinder 16 in such manner that the flange 18 of the adapter 12 is engaged by the locking collar. Obviously, this adapter 12 may be made of any suitable shape or size, and is utilized in connecting the shaper 10 to the meat grinder 16. The adapter 12 is externally threaded, as at 20, and threadedly engaged on the externally threaded portion 20 of the adapted collar is an internally threaded shaper member 22 having a substantially cylindrical section 24 which is adapted to receive the ground meat product passing from the adapter 12 and from the grinder 16. The shaper portion 22 flares outwardly to a comparatively wide mouth, and is provided with a downwardly sloping upper plate 26 as well as a downwardly sloping lower plate 28 which does not slope at as great an angle as the upper plate 26 so as to be converging to form a restricted opening at the mouth end of the shaper. It is to be noted that while the mouth end is substantially wider, the total size of the opening at the mouth end of the shaper 22 is less than the cross-sectional area of the cylindrical portion 24.

The upper plate 26 is provided with a plurality of downwardly extending pressure ribs or teeth 30. Further, the upper plate has a rib 32 at one side thereof into which wing screws 34 may be threaded. A pair of studs 36 are affixed to the upper plate 26 oppositely disposed from the rib 32.

There is provided a platform 40 having upwardly extending flanges 42 and 44, the flange 42 being provided with apertures 46 therethrough for reception of the studs 36 while the flange 44 has slots 48 therein through which the thumb screws 34 extend, the thumb screws frictionally holding by engagement with the flange 34 the entire platform in position. A substantially U-shaped member 50 is secured by means of screws, as at 52, to the platform 40 at the underside thereof, as can be best seen in Figure 1, and a shaft 56 is provided for mounting a roll of paper 58. Wing nuts 60 hold the roll of paper 58 in position. The front end of the platform 40 is provided with an arcuate surface 62 over which the paper sheet of the paper roll 58 is fed. The other end of the platform 40 is provided with a trough 64 for reception of a lip on the edge of a receptacle and for receiving a knife blade which will enable the finished meat product to be cut in the size desired.

A shears or automatic knives as well as any other means for cutting the paper and associated meat product may be utilized and the meat product can then be stacked, as may be desired.

In practical use of the present invention, the attachment or apparatus generally designated by the numeral 10 is connected to a discharge from a meat grinder or meat conveying mechanism for receiving ground meat therefrom. The portion of the housing or shaper member 22 is tubular and cylindrical and is provided with outwardly diverging side portions interconnected by upper and lower walls which converge towards each other and towards the outlet for discharging a strip meat product onto the paper on the platform 40. During the transition from a cylindrical cross-section to a transversely elongated cross-section, the meat passes outwardly and over the longitudinally extending and parallel ribs or teeth 30 on the upper wall 26 thereby interweaving and bonding the fibers of the meat together and providing a strip meat product of substantially the same compactness throughout its width. It is noted that the lower wall 28 extends downwardly in a sloping direction and the portion of the shaper 22 inwardly of the downwardly sloping lower wall 28 slopes upwardly thereby affording a change of direction in the flow of the ground meat thereby assuring the compacting of the meat. The ribs or teeth 30 also act to score and shape the upper surface of the meat product to form a corrugated surface thereon which increases the surface area of the meat product and also provides a meat product of extremely attractive appearance and the teeth or ribs 30 extend substantially to the outlet of the shaper for assuring proper compression of the meat and also for assuring that the strip of meat product will engage the paper at an acute angle which will propel the paper along the platform 40.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An apparatus for forming a cohesive meat product from ground meat for use in conjunction with a ground meat conveying mechanism comprising a hollow housing having one end adapted to communicate with the discharge from the meat conveying mechanism, the other end of said housing having an outlet of transversely elongated cross-section of a width greater than the width of said one end of the housing for discharging a meat product in strip form and an intermediate portion having side portions diverging towards the outlet and upper and lower converging walls interconnecting the side portions thereby forming a compression area for the ground meat, at least one of said walls having a plurality of projections extending into the path of movement of the meat thereby forming longitudinal depressions in at least one surface of the strip of meat product, said projections being in the form of teeth extending substantially to the outlet, said projections and compression of the ground meat coacting to interweave the meat fibers for bonding the ground meat together and forming a cohesive meat product having an increased surface area on at least one side thereof.

2. An apparatus for forming a cohesive meat product from ground meat for use in conjunction with a ground meat conveying mechanism comprising a hollow housing having one end adapted to communicate with the discharge from the meat conveying mechanism, the other end of said housing having an outlet of transversely elongated cross-section of a width greater than the width of said one end of the housing for discharging a meat product in strip form and an intermediate portion having side portions diverging towards the outlet and upper and lower converging walls interconnecting the side portions thereby forming a compression area for the ground meat, at least one of said walls having a plurality of projections extending into the path of movement of the meat thereby forming longitudinal depressions in at least one surface of the strip of meat product, said projections and compression of the ground meat coacting to interweave the meat fibers for bonding the ground meat together and forming a cohesive meat product having an increased surface area on at least one side thereof, the converging walls sloping downwardly with the upper wall sloping at a greater angle than the lower wall thereby discharging a strip of meat in a downwardly sloping direction, said lower wall including an inner portion sloping upwardly thereby changing the direction of flow of the meat, said teeth being in the form of longitudinal ribs extending inwardly from the outlet to a point beyond the end of the upwardly sloping wall surface to bond the fibers of the meat throughout the outward movement thereof.

3. An apparatus for forming a cohesive meat product from ground meat comprising a tubular housing having a cylindrical area adapted to communicate with the discharge end of a meat grinder, an intermediate portion having outwardly diverging side portions and converging top and bottom walls forming a meat compressing area, and an end portion terminating in a transversely elongated outlet of rectangular cross-section, said end portion having downwardly sloping the top and bottom walls with top wall sloping at a greater angle than the bottom wall thereby forming converging walls for additionally compressing the meat and spreading the same outwardly for discharging a strip of meat product from the outlet in a downwardly sloping direction with the strip of meat product having substantially the same degree of compactness throughout its width, a plurality of depending ribs on the inner surface of the upper wall and extending longitudinally from the outlet to a point beyond the end portion of the housing whereby the ground meat fibers will be bonded together by movement transversely of the longitudinal ribs in the transition from a cylindrical cross-section to a transversely elongated rectangular cross-section thereby forming a substantially solid strip of meat product with longitudinal ridges and depressions on the upper surface thereof for increasing the area of air contact therewith, a delivery platform underlying the outlet for receiving the strip of meat product therefrom, and means for supplying a strip of paper material between the platform and the strip of meat product for underlying the meat product, the strip of meat product engaging the paper at an acute angle whereby the movement of the strip of meat product from the outlet will propel the paper material over the platform.

4. The combination of claim 3 wherein said platform is provided with an upwardly opening trough at the outer end thereof for supporting an edge of a receptacle for the meat product and for receiving a blade of a cutting device for severing the paper and meat product.

5. An apparatus for forming a cohesive meat product from ground meat for use in conjunction with a ground meat conveying mechanism comprising a hollow housing having one end adapted to communicate with the discharge from the meat conveying mechanism, the other end of said housing having an outlet of transversely elongated cross-section of a width greater than the width of said one end of the housing for discharging a meat product in strip form and an intermediate portion having side portions diverging towards the outlet and upper and lower converging walls interconnecting the side portions thereby forming a compression area for the ground meat, at least one of said walls having a plurality of projections extending into the path of movement of the meat thereby forming longitudinal depressions in at least one surface of the strip of meat product, said projections and compression of the ground meat coacting to interweave the meat fibers for bonding the ground meat together and forming a cohesive meat product having an increased surface area on at least one side thereof, the upper of said converging walls sloping downwardly, said projections disposed on the upper wall and including a plurality of parallel and longitudinally extending teeth.

References Cited in the file of this patent

UNITED STATES PATENTS

| | | |
|---|---|---|
| 2,123,336 | Kabus | July 12, 1938 |
| 2,203,318 | Yerk | June 4, 1940 |
| 2,209,824 | Louisot et al. | July 30, 1940 |
| 2,386,775 | Balzarini | Oct. 16, 1945 |
| 2,654,121 | Nelson | Oct. 6, 1953 |
| 2,694,222 | Spang | Nov. 16, 1954 |